United States Patent
Chaucherie et al.

(10) Patent No.: US 11,602,727 B2
(45) Date of Patent: Mar. 14, 2023

(54) METHOD FOR TREATING FLUE GAS FROM COMBUSTION UNITS

(71) Applicant: SARP INDUSTRIES, Limay (FR)

(72) Inventors: Xavier Chaucherie, Versailles (FR); Bruno Gilardin, Verneuil d'Avre et d'Iton (FR); Corinne Ramombordes, Rognac (FR)

(73) Assignee: SARP INDUSTRIES, Limay (FR)

( * ) Notice: Subject to any disclaimer, the term of this patent is extended or adjusted under 35 U.S.C. 154(b) by 34 days.

(21) Appl. No.: 17/430,850

(22) PCT Filed: Feb. 19, 2020

(86) PCT No.: PCT/HR2020/050310
§ 371 (c)(1),
(2) Date: Aug. 13, 2021

(87) PCT Pub. No.: WO2020/169928
PCT Pub. Date: Aug. 27, 2020

(65) Prior Publication Data
US 2022/0161225 A1    May 26, 2022

(30) Foreign Application Priority Data

Feb. 20, 2019 (FR) .................................. 19 01714
Jul. 4, 2019 (FR) .................................. 19 07460

(51) Int. Cl.
*B01J 20/12* (2006.01)
*F23J 15/00* (2006.01)

(52) U.S. Cl.
CPC ............. *B01J 20/12* (2013.01); *F23J 15/003* (2013.01); *B01J 2220/42* (2013.01); *F23J 2215/10* (2013.01)

(58) Field of Classification Search
CPC ....... F23J 15/003; F23J 2215/10; B01J 20/12; B01J 2220/42; B01D 53/40; B01D 53/501; B01D 53/56; B01D 53/60; B01D 53/68; B01D 53/74; B01D 2251/206; B01D 2251/40; B01D 2251/404; B01D 2257/204; B01D 2257/302; B01D 2257/404; B01D 2258/0283; B01D 2258/0291

See application file for complete search history.

(56) References Cited

U.S. PATENT DOCUMENTS

| | | | | |
|---|---|---|---|---|
| 5,058,514 A | * | 10/1991 | Mozes | ........................ F23J 7/00 |
| | | | | 423/243.08 |
| 2010/0203461 A1 | | 8/2010 | Maly et al. | |
| 2011/0250111 A1 | | 10/2011 | Pollack et al. | |
| 2017/0100618 A1 | | 4/2017 | Raythatha et al. | |

FOREIGN PATENT DOCUMENTS

| | | | | |
|---|---|---|---|---|
| CN | 111 974 342 A | * | 11/2020 | ............. B01J 20/08 |
| FR | 2 981 732 A1 | * | 4/2013 | ......... B01D 53/8659 |
| FR | 2981732 A1 | | 4/2013 | |
| WO | WO 96 04 979 A1 | * | 2/1996 | ........... B01D 53/501 |
| WO | 2013/060991 A1 | | 5/2013 | |

OTHER PUBLICATIONS

International Search Report dated Jun. 2, 2020 in corresponding International Application No. PCT/FR2020/050310; 5 pages.

* cited by examiner

*Primary Examiner* — Timothy C Vanoy
(74) *Attorney, Agent, or Firm* — Maier & Maier, PLLC

(57) ABSTRACT

The reduction of the acid gas concentration in the flue gas of combustion units that is produced in waste incinerators, by contacting the flue gas with a powder composition including an alkaline earth metal salt and an ammonium salt. The contact may be carried out in a combustion furnace and/or in a post-combustion chamber of the combustion units.

20 Claims, 1 Drawing Sheet

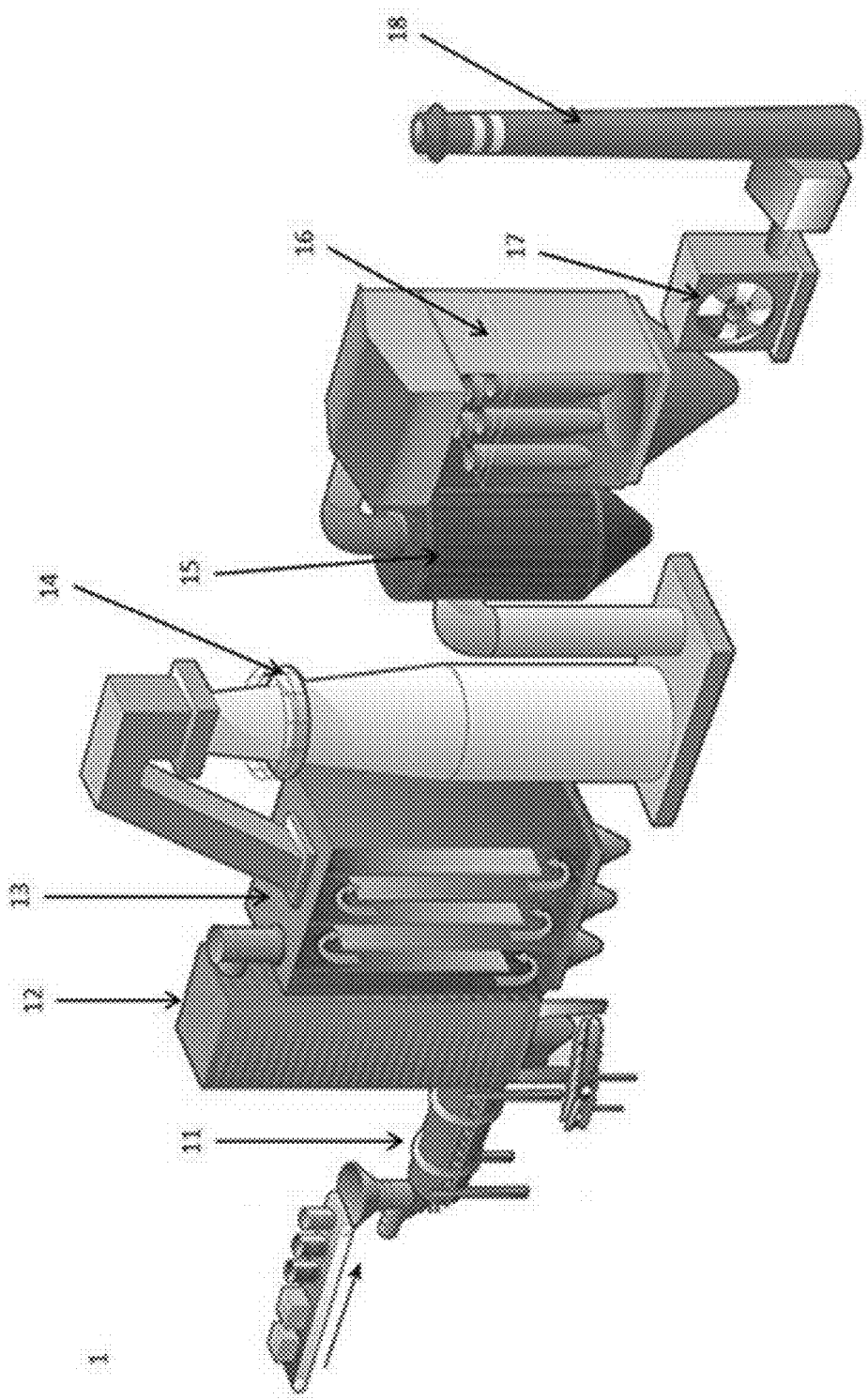

METHOD FOR TREATING FLUE GAS FROM COMBUSTION UNITS

FIELD

This invention relates to reducing the acid gas concentration in flue gas produced in a combustion unit, for example an incinerator for household refuse or for industrial hazardous waste.

BACKGROUND

Currently in France, incineration is the number two method of waste disposal. This waste comes from household trash as well as from hazardous industrial waste. Combustion of this waste results in the emission of flue gas containing acid gases such as nitrogen oxides ($NO_x$), hydrochloric acid (HCl), and sulfur dioxide ($SO_2$). Acid gases are pollutants that are harmful to humans as well as to the environment; their maximum concentration in flue gas is therefore set by regulatory standards. For example, according to the regulatory standard currently in force (Directive 2000/76/EC) of 11% $O_2$, the emission limit values are set at 200 mg/Nm³ for $NO_x$ ($NO_2$ equivalent), 10 mg/Nm³ for HCl, and 50 mg/Nm³ for $SO_2$.

The reduction in the concentration of acid gases contained in combustion flue gas is conventionally achieved by reacting said acid gases with one or more neutralizing reagents. These neutralizing reagents are selected according to the acid gases to be treated. For example, the $NO_x$ concentration can be reduced by a selective catalytic reduction (SCR) or selective non-catalytic reduction (SNCR) in the presence of neutralizing reagents such as ammonia ($NH_3$) or urea (CO($NH_2$)$_2$). SNCR is performed at high temperature (around 950° C.), while SCR is performed at low temperature (around 300° C.). The HCl and $SO_2$ concentrations are conventionally reduced by a process of forming chlorides and sulfates with neutralizing reagents which can be lime, sodium bicarbonate, or soda.

These processes are effective in routine practice but do not always allow maintaining the concentrations of NOx, $SO_2$, and HCl below the limit values, in particular when peaks of acid gas concentrations appear in the flue gas. To respond to this problem, neutralizing reagents are injected in excess quantity, which leads to significant consumption of said neutralizing reagents. This significant consumption leads to a considerable added cost of raw materials and requires frequent maintenance shutdowns.

The neutralizing reagents involved in these processes are also hazardous for the operators.

In addition, these processes can generate corrosion and/or cause fouling of the boilers of the combustion units, which decreases the production of energy by said boilers.

So solve this last problem, WO 2013/060991 describes a reagent capable of neutralizing $SO_2$/HCl acid gases directly in the combustion furnace or in the post-combustion chamber of a combustion unit. This reagent may comprise products based on alkalis, alkaline earth metals, calcium oxide, hydrated lime, limestone, calcium carboxylic salts, clays, and/or reducing organic compounds. This reagent therefore does not include ammonium salts. In addition, it is not intended to reduce the concentration of acid gases other than $SO_2$ and HCl, for example NOx.

There is therefore always a need for an efficient, safe, and economical solution for decreasing the concentration of a wide range of acid gases contained in flue gas produced in a combustion unit, such as incinerators for household waste or for industrial hazardous waste.

It is thus to the credit of the inventors that they have found it possible to meet this need by means of a reactive powder composition comprising an alkaline earth salt and an ammonium salt.

SUMMARY

Thus, a first object of the invention is a method for treating combustion flue gas comprising acid gases, said method comprising a contact step a) of placing said acid gases in contact with a powder composition comprising an alkaline earth metal salt and an ammonium salt in an oxidizing atmosphere and at a temperature greater than or equal to 850° C.

Advantageously, the method according to the invention makes it possible to reduce the concentration of acid gases in combustion flue gas in an efficient manner.

The method according to the invention thus advantageously makes it possible to maintain the concentration of acid gases in combustion flue gas below the values set by regulatory standards even when peaks in the acid gas concentration appear in the combustion flue gas.

The method according to the invention is also more economical and safer than conventional methods for reducing the acid gas concentration in combustion flue gas, because:
- the cost of the powder composition is lower than that of the neutralizing reagents conventionally used, and
- an efficient reduction of the acid gas concentration in combustion flue gas allows significantly reducing the consumption of the neutralizing reagents conventionally used, and therefore reducing the costs and risks associated with said neutralizing reagents and reducing the costly maintenance shutdowns.

A second object of the invention is a powder composition comprising an alkaline earth metal salt and an ammonium salt.

BRIEF DESCRIPTION OF THE DRAWINGS

FIG. 1 is a diagram illustrating a combustion unit.

DETAILED DESCRIPTION

According to a first object, the invention relates to a method for treating combustion flue gas comprising acid gases, said method comprising a contact step a) of placing said acid gases in contact with a powder composition comprising an alkaline earth metal salt and an ammonium salt in an oxidizing atmosphere and at a temperature greater than or equal to 850° C., in particular at a temperature comprised between 900° C. to 1000° C., more particularly 940° C. to 960° C.

For the purposes of the invention, the term "combustion flue gas" is understood to mean flue gas produced in a combustion unit. A combustion unit is conventionally an industrial facility intended for the incineration of waste, such as non-hazardous or hazardous waste, municipal or industrial sludge, but also for the combustion of biomass or coal or coal-biomass co-combustion.

For the purposes of the invention, the term "powder composition" is understood to mean a composition in the form of powder. In particular, the maximum diameter of 90% of the particles in the volume distribution (d90) of the powder composition according to the invention can be less than or equal to 50 µm, preferably from 2 µm to 10 µm, more preferably from 4 µm to 6 µm. The d90 value is determined by liquid laser particle size distribution in distilled water with a Malvern-Mastersizer 2000 laser particle size analyzer equipped with a "small volume" cell of 120 ml; the signal is processed with Mie's mathematical model.

Advantageously, a particle size distribution in the above ranges makes it possible to increase the contact surface area of the powder composition with the acid gases of the combustion flue gas and thus to increase the efficiency of the reduction in the acid gas concentration in combustion flue gas.

For the purposes of the present invention, the term "alkaline earth metal salt" is understood to mean a chemical compound comprising an anion and an alkaline earth metal cation, such as a cation of beryllium (Be), magnesium (Mg), calcium (Ca), strontium (Sr), barium (Ba), radon (Ra), and mixtures thereof. Preferably, the alkaline earth metal salt is selected among a magnesium salt, a calcium salt, and mixtures thereof. More preferably, it is a calcium salt.

For the purposes of the present invention, the term "ammonium salt" is intended to mean a chemical compound comprising an anion and an ammonium cation of the crude formula $NH_4^+$.

For the purposes of the present invention, the term "oxidizing atmosphere" is understood to mean an atmosphere comprising oxygen ($O_2$) and carbon dioxide ($CO_2$). Typically, the partial pressure of $O_2$ ($PO_2$) in the oxidizing atmosphere is less than 0.5 bar, more particularly from 0.01 bar to 0.25 bar, even more particularly from 0.05 bar to 0.1 bar. Typically, the partial pressure of $CO_2$ ($PCO_2$) in the oxidizing atmosphere is less than 0.5 bar, more particularly from 0.05 bar to 0.2 bar, even more particularly from 0.095 bar to 0.15 bar.

Without wishing to be bound by any theory, the inventors are of the opinion that, during the contact step a), the alkaline earth metal and the ammonium salt respectively form an oxide of the alkaline earth metal and of ammonia ($NH_3$) which react with the acid gases of the combustion flue gas. By means of this reaction sequence, the reduction in the concentration of acid gases in combustion flue gas by the powder composition is highly efficient.

The chemical composition of acid gases depends on the composition of the waste to be incinerated. For the purposes of the present invention, the term "acid gas" is understood to mean a gas which, on contact with water, produces an aqueous solution having an acidic pH, i.e. a pH less than 7. Typically, acid gases are classified according to the five following categories:

phosphorous acid gases such as phosphoric acid ($H_3PO_4$), carbonaceous acid gases such as carbon dioxide ($CO_2$), nitrous acid gases such as nitrogen oxides (NON), hydrogen cyanide (HCN), and mixtures thereof,
sulfurous acid gases such as sulfur dioxide ($SO_2$), hydrogen sulfide ($H_2S$), and mixtures thereof, and
halogenated acid gases such as hydrogen fluoride (HF), difluoride ($F_2$), hydrogen chloride (HCl), chlorine ($Cl_2$), hydrogen bromide (HBr), bromine ($Br_2$), hydrogen iodide (HI), iodine ($I_2$), and mixtures thereof, in particular hydrogen fluoride (HF), hydrogen chloride (HCl), hydrogen bromide (HBr), and mixtures thereof, and more particularly hydrogen chloride (HCl).

According to one embodiment, the acid gases can be selected among $H_3PO_4$, $CO_2$, $NO_x$, HCN, $SO_2$, $H_2S$, HF, $F_2$, HCl, $Cl_2$, HBr, $Br_2$, HI, $I_2$, and mixtures thereof, in particular selected among $CO_2$, $NO_x$, HCN, $SO_2$, $H_2S$, HF, HCl, HBr, and mixtures thereof.

According to one specific embodiment, the acid gases can be selected among $NO_x$, $SO_2$, HCl, and mixtures thereof.

This specific embodiment is very advantageous because the powder composition efficiently and all at once reduces the concentration of NOx, $SO_2$, HCl, or mixtures thereof in said combustion flue gas. Indeed, during the contact step a) the ammonia reacts with NOx to form nitrogen ($N_2$) and water ($H_2O$), and the alkaline earth metal oxide reacts with $SO_2$ by a sulfation reaction and with HCl by a chlorination reaction.

In particular, the method according to the invention allows an efficient reduction of the $SO_2$ concentration. Indeed, the sulfation reaction is thermodynamically facilitated in the presence of HCl and under the operating conditions of the contact step a).

Advantageously, the alkaline earth metal salt can comprise a cation selected among a magnesium cation, a calcium cation, and mixtures thereof, and preferably can be the calcium cation. Typically, the anion of the alkaline earth metal salt can be selected among an acetate, an acrylate, a carbonate, a formate, a propionate, and mixtures thereof, in particular among an acetate, an acrylate, a carbonate, and mixtures thereof; more particularly the anion is a carbonate.

According to one specific embodiment, the alkaline earth metal salt is a calcium salt, in particular calcium carbonate.

The calcium carbonate can come from chalk, limestone, lime, industrial waste, and mixtures thereof, in particular from lime, industrial waste, and a mixture thereof, more particularly from lime.

For example, the industrial waste can be selected among mineral sludge, in particular mineral sludge mainly composed of calcium carbonate and which can, if necessary, be transformed into a powder reagent by means of one or more suitable chemical treatments. The chemical treatments are those known to those skilled in the art such as, for example, washing, drying, physicochemical treatments. Decarbonation sludge, sludge from primary brine purification, and a mixture thereof, are quite suitable for use in the invention.

Decarbonation sludge is a non-hazardous waste conventionally generated during a water decarbonation operation, an operation implemented at industrial sites requiring supplies of softened water. Each of these sites can generate 1,000 to 3,000 tons/year of decarbonation sludge. Advantageously, using decarbonation sludge as a source of calcium carbonate therefore makes it possible to monetize waste which is not currently monetized and to create a circular economy by the availability of this waste around the incinerators. This also makes it possible to replace a natural resource (chalk, limestone, and lime) with waste. Decarbonation sludge generally comprises about 65% calcium carbonate, the remainder being water. To be used in step a) of the method of the invention, it can therefore be dried so that the calcium carbonate content in the dried sludge is between 94% and 99.6%.

Sludge from primary brine purification is waste resulting from electrolysis in the production of chlorine. It contains calcium and magnesium carbonates as well as traces of pollutants, salts, and possibly metals. The pollutants, salts, and possible metals can be separated by specific operations known to those skilled in the art, such as successive washings or physicochemical treatments. The water can be removed by drying.

Advantageously, under the operating conditions of the contact step a), the kinetics of the oxidation of calcium salts to calcium oxide (CaO) and the kinetics of the reaction between CaO and the acid gases are very fast. The reduction in the concentration of acid gases is then highly efficient.

This is all the more true if the calcium salt is calcium carbonate and the acid gases comprise $SO_2$ and/or HCl.

According to one embodiment, the ammonium salt can be selected among ammonium carbonate, ammonium chloride, ammonium sulfate, ammonium sulfide, and mixtures thereof; in particular the ammonium salt is ammonium sulfate.

Advantageously, under the operating conditions of the method according to the invention, the kinetics of the formation of ammonia from ammonium sulfate is rapid. The reduction in the concentration of acid gases is then highly efficient. This is all the more true if the acid gases comprise NOx.

Ammonium sulfate also exhibits an anti-fouling property. The fouling of combustion units is caused by the formation and deposition of ash during the incineration of wastes comprising high concentrations of chlorine and alkaline substances. Fouling has a significant economic impact, because it affects the proper operation of the boiler of the combustion unit, which limits the production of energy by said boiler. In addition, if the fouling becomes too significant, it requires a complete shutdown of the boiler for maintenance and thus of the combustion unit. Due to its anti-fouling property, ammonium sulfate advantageously maintains the proper operation and the energy performance of the boiler. Ammonium sulfate also increases the interval of time between two complete shutdowns for maintenance of the combustion unit.

According to one embodiment, the powder composition may comprise, relative to the total weight of the composition, at least 50% of alkaline earth metal salt, in particular from 60% to 90% of alkaline earth metal salt, more particularly from 69% to 71% of alkaline earth metal salt, and the mass ratio between the ammonium salt and the alkaline earth metal salt is from 0.05 to 0.3, in particular from 0.15 to 0.25, more particularly from 0.20 to 0.22.

Advantageously, the powder composition of this embodiment allows an efficient reduction of the concentration of acid gases contained in combustion flue gas without altering the operation of the combustion unit.

Indeed, when the mass percentage of the alkaline earth salt in the powder composition and the mass ratio between the ammonium salt and the alkaline earth metal salt are lower than the values indicated above, then there can be a shortfall of ammonia and alkaline earth metal oxide relative to the acid gases such that the reduction in the acid gas concentration in the flue gas is less efficient.

Similarly, when the mass ratio between the ammonium salt and the alkaline earth metal salt is greater than the values indicated above, then there may be an excess of ammonia, which is a corrosive and toxic compound, relative to the acid gases. This excess ammonia can, for example, damage the combustion unit and require a specific treatment unit.

According to one embodiment, the powder composition may comprise calcium carbonate and ammonium sulfate.

According to a variant of this embodiment, the powder composition may comprise, relative to the total weight of the composition, at least 50% of calcium carbonate, in particular from 60% to 90% of calcium carbonate, and the mass ratio between the ammonium sulfate and the calcium carbonate is from 0.05 to 0.3, in particular from 0.15 to 0.25.

More particularly, the powder composition may comprise, relative to the total weight of the composition, from 69% to 71% of calcium carbonate, and the mass ratio between the ammonium sulfate and the calcium carbonate is from 0.20 to 0.22.

According to one embodiment, the powder composition according to the invention may further comprise an additive. This additive can be selected among a clay, a bromine salt, and mixtures thereof; in particular the additive is a clay.

For the purposes of the present invention, the term "clay" is understood to mean a chemical compound based on hydrated silicates or aluminosilicates of lamellar structure. Typically, the clay can be selected among amesite, antigorite, beidellite, berthierine, celadonite, chrysolite, cronstedtite, damouzite, dickite, glauconite, halloysite, illite, kaolinite, lizardite, montmorillonite, muscovite, nacrite, nontronite, paragonite, pyrophyllite, sericite, vermiculite, and mixtures thereof, in particular among antigorite, chrysolite, damouzite, halloysite, kaolinite, montmorillonite, nacrite, pyrophyllite, vermiculite, and mixtures thereof, more preferably kaolinite.

Clay, in particular kaolinite, advantageously exhibits an anti-corrosion property. Corrosion of an element of the combustion unit, in particular the boiler, is caused by deposits of inorganic compounds present in certain wastes. Corrosion reduces the safety of the combustion unit and has a significant economic impact as it necessitates replacement of the corroded element of the combustion unit. Due to its anti-corrosion property, clay, in particular kaolin, makes it possible to maintain the safety of the combustion unit and reduces the replacement of elements of the combustion unit.

For the purposes of the present invention, the term "bromine salt" is understood to mean a chemical compound comprising an anion and a bromide cation. Typically, the bromine salt can be selected among sodium bromide, potassium bromide, calcium bromide, and mixtures thereof, in particular sodium bromide.

Certain industrial wastes may contain mercury which is found in the combustion flue gas produced during incineration of these wastes. Due to the acute toxicity of mercury, the maximum value of mercury allowed in flue gas from combustion units is very low (0.05 mg/Nm$^3$). Under the operating conditions of the contact step a), bromine salt oxidizes the mercury present in the combustion flue gas to form oxidized mercury which can then easily be captured by activated carbon or acid scrubbers. Advantageously, bromine salt facilitates reduction of the mercury concentration in combustion flue gas.

When the powder composition according to the invention further comprises an additive as defined above, it advantageously comprises, relative to the total weight of the composition, at least 50% of alkaline earth metal salt, in particular from 60% to 90% of alkaline earth metal salt, more particularly from 69% to 71% of alkaline earth metal salt, the mass ratio between the ammonium salt and the alkaline earth metal salt is from 0.05 to 0.3, in particular from 0.15 to 0.25, more particularly from 0.20 to 0.22, and the mass ratio between the additive and the alkaline earth metal salt is from 0.05 to 0.3, in particular from 0.15 to 0.25, more particularly from 0.20 to 0.22.

According to a variant of this particular embodiment, the additive is a clay and the powder composition comprises, relative to the total weight of the composition, at least 50% of alkaline earth metal salt, in particular from 60% to 90% of alkaline earth metal salt, more particularly from 69% to 71% of alkaline earth metal salt, the mass ratio between the ammonium salt and the alkaline earth metal salt is from 0.05 to 0.3, in particular from 0.15 to 0.25, more particularly from 0.20 to 0.22, and the mass ratio between the clay and the alkaline earth metal salt is from 0.05 to 0.3, in particular from 0.15 to 0.25, more particularly from 0.20 to 0.22.

Preferably the alkaline earth metal salt is calcium carbonate and the ammonium salt is ammonium sulfate.

In this variant, the clay is preferably kaolinite. The powder composition may thus comprise kaolinite and, relative to the total weight of the composition, at least 50% of calcium carbonate, in particular from 60% to 90% of calcium carbonate, the mass ratio between the ammonium sulfate and the calcium carbonate is from 0.05 to 0.3, in particular from 0.15 to 0.25, and the mass ratio between the kaolinite and the calcium carbonate is from 0.05 to 0.3, in particular from 0.15 to 0.25.

According to one particular variant, the powder composition can comprise kaolinite and, relative to the total weight of the composition, from 69% to 71% of calcium carbonate, the mass ratio between the ammonium sulfate and the calcium carbonate is from 0.20 to 0.22, and the mass ratio between the kaolinite and the calcium carbonate is from 0.20 to 0.22.

At the end of step a) of placing the acid gases contained in the combustion flue gas in contact with the powder composition, the flue gas may comprise a residual concentration of acid gases. Thus, according to one particular embodiment, the method of the invention may comprise, after the contact step a), a step b) of neutralizing the residual acid gases in the flue gas resulting from step a).

Step b) of neutralizing the residual acid gases is typically carried out at a temperature less than or equal to 250° C., by placing the flue gas from step a) in contact with lime, sodium bicarbonate, soda, a reducing agent such as ammonia or urea, and mixtures thereof.

The contact between the flue gas from step a) and lime, sodium bicarbonate, soda, and mixtures thereof, is particularly effective in reducing the residual concentration of HCl and/or $SO_2$.

The contact between the flue gas resulting from step a) and an ammonia or urea type of reducing agent, and mixtures thereof, is particularly effective in reducing the residual concentration of NOx. This contact may be followed by passage through a selective catalytic reduction unit.

The method according to the invention makes it possible to reduce the acid gas concentration in combustion flue gas, i.e. the flue gas produced by a combustion unit 1 as schematically represented in FIG. 1. A combustion unit 1 typically comprises, in the direction of flow, a combustion furnace 11, for example rotary, a flue gas post-combustion chamber 12, a flue gas cooling unit comprising a boiler 13 then a cooling tower 14, a cooled flue gas neutralization unit 15, a flue gas filtration unit 16, a ventilation and flue gas extraction unit 17 and a chimney 18.

Typically, the waste incineration is carried out in the combustion furnace 11 during an incineration step. The incineration step is conventionally carried out at a temperature ranging from 850° C. to 1000° C. and produces the combustion flue gas which contains the acid gases. This flue gas is then sent to the post-combustion chamber 12 to be burned during a post-combustion step. The post-combustion step is conventionally carried out at a temperature close to the temperature of the incineration step. Typically, the temperature in the combustion furnace 11 is 850° C. to 1200° C. and the temperature in the post-combustion chamber 12 is 900° C. to 1150° C.

According to one particular embodiment, the contact step a) of the method according to the invention is carried out in the combustion furnace 11 and/or in the post-combustion chamber 12 of the combustion unit 1.

Indeed, the temperature during the incineration step in the combustion furnace 11 and/or during the post-combustion step in the post-combustion chamber 12 is such that the contact step a) of the method according to the invention can advantageously be carried out there.

In this particular embodiment, it is therefore not necessary to add to the combustion unit 1 a unit specifically dedicated to reducing the acid gas concentration in the combustion flue gas. In addition, in this particular embodiment, it is not necessary to subsequently reheat the combustion flue gas in order to treat it. Thus, according to this particular embodiment, the energy efficiency of the method according to the invention is increased.

Typically, the powder composition can be injected into the combustion furnace 11, at the interface between the combustion furnace 11 and the post-combustion chamber 12, and/or into the post-combustion chamber 12.

The powdery powder can be injected using an injection device such as a volumetric dosing screw, a weight-based dosing screw, or a microdose dosing screw.

Because of its particle size distribution, the powder composition has flow properties that allow good injection.

In one particular embodiment, step b) of neutralizing the residual acid gases in the flue gas resulting from contact step a) can be carried out in the cooled flue gas neutralization unit 15.

In this particular embodiment, it is therefore not necessary to add to the combustion unit 1 a unit specifically dedicated to neutralizing the residual acid gases in the flue gas resulting from contact step a). Thus, according to this particular embodiment, the energy efficiency of the method of the invention is increased.

A second object of the invention is a powder composition comprising an alkaline earth metal salt and an ammonium salt.

The powder composition according to the second object of the invention is as described above in relation to the method for treating combustion flue gas comprising acid gases, which is the first object of the invention.

Unless otherwise indicated or in case of obvious incompatibility, the embodiments of the invention described above can be combined with each other.

The invention is described in more detail below, with the aid of the following examples which are in no way limiting but are given solely as examples.

EXAMPLES

This example describes an industrial test of the powder composition according to the invention carried out on a combustion unit 1 which is an existing hazardous waste incineration line.

The combustion unit 1 used is represented in the diagram of FIG. 1 and is composed of the following elements:
 a rotary combustion furnace 11,
 a post-combustion chamber 12,
 a boiler 13 with injection of solid urea in the first leg,
 a flue gas cooling tower 14,
 a cooled flue gas neutralization unit 15,
 a flue gas filtration unit 16 comprising two bag filters,
 a ventilation and flue gas extraction unit 17, and
 a chimney 18.

Lime is injected into the cooled flue gas neutralization unit 15.

For carrying out the tests, the tested powder composition comprises:
 70% calcium carbonate,
 15% ammonium sulfate, and
 15% kaolin
and has a d90 value of 47.6 μm.

The d90 value of the powder composition is determined according to the following protocol:

A sample of the powder composition is mixed with distilled water in an external ultrasonic tank and stabilized for 10 minutes.

The stabilized sample is introduced into a "small volume" measurement cell (120 ml) of a Malvern-Mastersizer 2000 laser particle size analyzer. The pump speed is 3000 rpm. The quantity of stabilized sample introduced and analyzed corresponds to obtaining a degree of laser obscuration in the red comprised between 15 and 17%. The laser obscuration in the red is stabilized for 20 minutes before the measurement. Despite this stabilization of 20 minutes, strong agglomeration is present but does not prevent the measurement from being carried out.

The powder composition tested is stored in a 20-ton capacity silo. The injection at the bottom of the post-combustion chamber 12 (1$^{st}$ third) is done at two diametrically opposed points so as to optimize intimate contact between the powder composition and the acid gases to be neutralized, namely $SO_2$, HCl, and NOx. This injection is done through the use of a dosing screw located downstream of a load cell placed under the silo to control and regulate the mass flow rates of the injection. To do this, regulation with threshold values set at 150 mg/Nm$^3$ for $SO_2$ and HCl (measurements taken at the outlet of the boiler 13) is implemented with corresponding mass flow rates varying from 20 kg/h to 200 kg/h depending on the values measured above 150 mg/Nm$^3$. In order to know the efficiency of the reduction of the concentrations of $SO_2$, HCl, and NOx, measurements were carried out upstream, i.e. before injection of the powder composition tested, in the post-combustion chamber 12, and downstream at the boiler outlet 13.

During the tests, the temperature in the combustion chamber is 950° C.

[Table 1] shows all results obtained in thirteen tests with injection of the powder composition tested.

TABLE 1

| Test no. | [SO2] upstream (mg/Nm3) | [SO2] downstr. (mg/Nm3) | Efficiency (%) | [HCl] upstream (mg/Nm3) | [HCl] downstr. (mg/Nm3) | Efficiency (%) | [NOx] upstream (mg/Nm3) | [NOx] downstr. (mg/Nm3) | Efficiency (%) |
|---|---|---|---|---|---|---|---|---|---|
| 1 | 937.5 | 247.2 | 73.6 | 961.2 | 523.1 | 45.6 | 923.6 | 61.7 | 93.3 |
| 2 | 837.6 | 229.3 | 72.6 | 720.2 | 460.9 | 36.0 | 476 | 82.2 | 82.7 |
| 3 | 1138 | 125.5 | 89.0 | 376.7 | 230.7 | 38.8 | 806 | 55 | 93.2 |
| 4 | 468.8 | 92.1 | 80.4 | 739.7 | 499.9 | 32.4 | 487.3 | 63.3 | 87.0 |
| 5 | 663.7 | 97.5 | 85.3 | 629.9 | 470.1 | 25.4 | 350.5 | 39.9 | 88.6 |
| 6 | 608.8 | 37.4 | 93.9 | 782 | 570.2 | 27.1 | 337.3 | 32.1 | 90.5 |
| 7 | 266.9 | 49.8 | 81.3 | 597.2 | 429.9 | 28.0 | 268.3 | 26.1 | 90.3 |
| 8 | 325.5 | 79.9 | 75.5 | 309.2 | 230.3 | 25.5 | 247.4 | 31 | 87.5 |
| 9 | 755.3 | 145.1 | 80.8 | 448 | 311.1 | 30.6 | 298.2 | 39.1 | 86.9 |
| 10 | 396.6 | 105.1 | 73.5 | 807.1 | 529.9 | 34.3 | 336.4 | 32.5 | 90.3 |
| 11 | 1259 | 168.3 | 86.6 | 1273 | 870.2 | 31.6 | 299.2 | 23.1 | 92.3 |
| 12 | 1350 | 375.2 | 72.2 | 1537 | 920.1 | 40.1 | 503.1 | 62.1 | 87.7 |
| 13 | 817.9 | 199 | 75.7 | 1649 | 998.2 | 39.5 | 334.1 | 40.9 | 87.8 |
|  |  |  | 80.0 |  |  | 33.5 |  |  | 89.1 |

It appears that:
- the average efficiency in reducing $SO_2$ concentrations is 80%,
- the average efficiency in reducing HCl concentrations is 33%, and
- the average efficiency in reducing NOx concentrations is 89%.

The powder composition tested therefore allows efficient reduction of HCl and highly efficient reduction of $SO_2$ and NOx.

In addition, the amount of lime injected into the cooled flue gas neutralization unit 15 during the thirteen tests is approximately four times less than the amount of lime that would have been injected into this neutralization unit 15 if the powder composition tested had not been injected into the post-combustion chamber 12.

The powder composition tested therefore allows a significant reduction in the consumption of lime. It therefore allows a significant reduction in the costs and risks associated with this raw material and a reduction in costly maintenance shutdowns.

The invention claimed is:

1. A method for treating combustion flue gas comprising acid gases, said method comprising a contact step a) of placing said acid gases in contact with a powder composition comprising an alkaline earth metal salt, an ammonium salt, and an additive in an oxidizing atmosphere and at a temperature greater than or equal to 850° C.,
wherein the additive is selected among a clay, a bromine salt, and mixtures thereof.

2. The method according to claim 1, wherein the acid gases are selected among $H_3PO_4$, $CO_2$, $NO_x$, HCN, $SO_2$, $H_2S$, HF, $F_2$, HCl, $Cl_2$, HBr, $Br_2$, HI, $I_2$, and mixtures thereof.

3. The method according to claim 1, wherein the alkaline earth metal salt comprises a cation selected among a magnesium cation, a calcium cation, and mixtures thereof.

4. The method according to claim 1, wherein the ammonium salt is selected among ammonium carbonate, ammonium chloride, ammonium sulfate, ammonium sulfide, and mixtures thereof.

5. The method according to claim 1, wherein the powder composition comprises calcium carbonate and ammonium sulfate.

6. The method according to claim 5, wherein the calcium carbonate comes from chalk, limestone, lime, industrial waste, and mixtures thereof.

7. The method according to claim 6, wherein the industrial waste is mineral sludge.

8. The method according to claim 7, wherein the mineral sludge is decarbonation sludge, sludge from primary brine purification, and a mixture thereof.

9. The method according to claim 1, wherein the powder composition comprises, relative to the total weight of the composition, at least 50% of alkaline earth metal salt, and the mass ratio between the ammonium salt and the alkaline earth metal salt is from 0.05 to 0.3.

10. The method according to claim 1, wherein the powder composition comprises a clay and, relative to the total weight of the composition, at least 50% of alkaline earth metal salt, the mass ratio between the ammonium salt and the alkaline earth metal salt is from 0.05 to 0.3, and the mass ratio between the clay and the alkaline earth metal salt is from 0.05 to 0.3.

11. The method according to claim 1, wherein the contact step a) is carried out in a combustion furnace and/or in a post-combustion chamber of a combustion unit.

12. A powder composition comprising an alkaline earth metal salt, an ammonium salt, and an additive, wherein the additive is selected among a clay, a bromine salt, and mixtures thereof.

13. The powder composition according to claim 12, wherein the alkaline earth metal salt comprises a cation selected among a magnesium cation, a calcium cation, and mixtures thereof.

14. The powder composition according to claim 12, wherein the ammonium salt is selected among ammonium carbonate, ammonium chloride, ammonium sulfate, ammonium sulfide, and mixtures thereof.

15. The powder composition according to claim 12, comprising calcium carbonate and ammonium sulfate.

16. The powder composition according to claim 15, wherein the calcium carbonate comes from chalk, limestone, lime, industrial waste, and mixtures thereof.

17. The powder composition according to claim 16, wherein the industrial waste is mineral sludge.

18. The powder composition according to claim 17, wherein the mineral sludge is decarbonation sludge, sludge from primary brine purification, and a mixture thereof.

19. The powder composition according to claim 12, comprising, relative to the total weight of the composition, at least 50% of alkaline earth metal salt, and the mass ratio between the ammonium salt and the alkaline earth metal salt is from 0.1 to 0.3.

20. The powder composition according to claim 12, comprising a clay and, relative to the total weight of the composition, at least 50% of alkaline earth metal salt, the mass ratio between the ammonium salt and the alkaline earth metal salt is from 0.1 to 0.3, and the mass ratio between the clay and the alkaline earth metal salt is from 0.1 to 0.3.

* * * * *